United States Patent
Goldhamer

(10) Patent No.: US 10,771,981 B2
(45) Date of Patent: Sep. 8, 2020

(54) VIRTUALIZATION AND CENTRAL COORDINATION IN WIRELESS NETWORKS

(71) Applicant: Mariana Goldhamer, Ramat Gan (IL)

(72) Inventor: Mariana Goldhamer, Ramat Gan (IL)

( * ) Notice: Subject to any disclaimer, the term of this patent is extended or adjusted under 35 U.S.C. 154(b) by 78 days.

(21) Appl. No.: 15/757,362

(22) PCT Filed: Sep. 5, 2016

(86) PCT No.: PCT/IB2016/055305
§ 371 (c)(1),
(2) Date: Mar. 4, 2018

(87) PCT Pub. No.: WO2017/037687
PCT Pub. Date: Mar. 9, 2017

(65) Prior Publication Data
US 2018/0262912 A1 Sep. 13, 2018

Related U.S. Application Data

(60) Provisional application No. 62/263,624, filed on Dec. 5, 2015, provisional application No. 62/214,996, filed on Sep. 6, 2015.

(51) Int. Cl.
*G06F 15/173* (2006.01)
*H04W 16/02* (2009.01)
(Continued)

(52) U.S. Cl.
CPC ............ *H04W 16/02* (2013.01); *H04L 67/10* (2013.01); *H04L 67/125* (2013.01); *H04L 69/22* (2013.01);
(Continued)

(58) Field of Classification Search
None
See application file for complete search history.

(56) References Cited

U.S. PATENT DOCUMENTS 9,578,593 B2 * 2/2017 McCann ............... H04L 45/302
10,531,336 B2 * 1/2020 Goldhamer ........... H04W 28/08
(Continued)

FOREIGN PATENT DOCUMENTS

EP 3046394 A4 * 8/2016 ............ H04W 48/18

OTHER PUBLICATIONS

3GPP TS 36.300v13.0.0, (Jun. 2015) "Overall description;Stage 2" (Release 12).
(Continued)

*Primary Examiner* — Dhairya A Patel

(57) ABSTRACT

A method for cellular network operation includes establishing communications in a cellular network between a given user equipment (UE) and a base station, comprising a virtualization platform and radio transceiver points (R-TP). A central coordinator selects a downlink coordinated transmission mode involving a first and a second R-TP which receive messages, over a control interface between the virtualization platform and each R-TP, including specifications of time-frequency resources to be used for user data and reference signals transmission. The radio processing functions in the communications with the given UE are performed while executing the selected coordinated mode by both selected R-TPs in accordance with the time-frequency resource specifications.

18 Claims, 3 Drawing Sheets

(51) Int. Cl.
   *H04L 29/08* (2006.01)
   *H04L 29/06* (2006.01)
   *H04W 24/08* (2009.01)
   *H04W 88/08* (2009.01)
   *H04W 92/12* (2009.01)

(52) U.S. Cl.
   CPC .......... *H04W 24/08* (2013.01); *H04W 88/085* (2013.01); *H04W 92/12* (2013.01)

(56) References Cited

U.S. PATENT DOCUMENTS

| | | |
|---|---|---|
| 2009/0232050 A1 | 9/2009 | Shen et al. |
| 2011/0302390 A1* | 12/2011 | Copeland ............. H04B 1/0003 712/2 |
| 2012/0044876 A1 | 2/2012 | Taaghol |
| 2012/0051296 A1 | 3/2012 | Kokku et al. |
| 2013/0195053 A1 | 8/2013 | Jeon et al. |
| 2013/0304938 A1 | 11/2013 | Hayes et al. |
| 2014/0133456 A1 | 5/2014 | Donepudi et al. |
| 2014/0259012 A1 | 9/2014 | Nandlall et al. |
| 2014/0362790 A1 | 12/2014 | McCann |
| 2015/0304960 A1* | 10/2015 | Yang ........................ H04L 1/06 370/252 |
| 2016/0020946 A1* | 1/2016 | Morper ................... H04L 45/60 709/222 |
| 2016/0066192 A1* | 3/2016 | Markwart ............. H04W 12/08 455/410 |

OTHER PUBLICATIONS

3GPP TS 36.423 V13.0.0 (Jun. 2015), "X2 application protocol (X2AP)" (Release 13).
3GPP TS 36.331v12.6.0, (Jun. 2015) "Radio Resource Control (RRC); Protocol specification" (Release 12).
3GPP TS 36.212 V125.0 (Jun. 2015), "Multiplexing and channel coding" (Release 12).
3GPP TS 36.321 V12.6.0 (Jun. 2015), "Medium Access Control (MAC) protocol specification", (Release 12).
3GPP TS 36322 V12.2.0 (Mar. 2015), "Radio Link Control (RLC) protocol specification", (Release 12).
3GPP TS 36.323 V12.4.0 (Jun. 2015), "Packet Data Convergence Protocol (PDCP) specification" (Release 12).
3GPP TS 23.203 V13.2.0 (Dec. 2014), "Policy and charging control architecture" (Release 13).

* cited by examiner

VIRTUALIZATION AND CENTRAL COORDINATION IN WIRELESS NETWORKS

CROSS-REFERENCE TO RELATED APPLICATION

This application claims the benefit of U.S. Provisional Patent Application 62/214,996, filed Sep. 6, 2015 and of U.S. Provisional Patent Application 62/263,624 filled Dec. 5, 2015, which are incorporated herein by reference.

FIELD OF THE INVENTION

The invention relates generally to digital communication systems and in particular to cellular systems using a central coordinator and the virtualization of part of base station functions.

BACKGROUND OF THE INVENTION

New technologies, as network functions virtualization (NFV) and software defined networks (SDN) have positive elements which reduce the deployment cost of the network elements, for example routers and switches.

NFV application to cellular networks was studied recently in the Small Cell Forum and NGMN Alliance.

SDN was applied to WiFi networks in different demos, based on the features and management interfaces of the IEEE 802.11a and IEEE 802.11k amendments. Based on these, an SDN Controller can allocate the power and select an operational channel.

3GPP LTE standards were designed for the distributed operation of the base stations and the CoMP (Collaborative Multi Point) standardized features were defined for distributed operation. The LTE architecture in Release 13, pictured in 3GPP TS 36.300 V13.0.0 (2015-06). FIG. 4-1 in this document does not include a Central Coordinator.

However some support for centralized coordination of inter-cell interference was introduced in LTE Release 12, but even in LTE Release 13 this support is limited only to a hypothesis on the assignment of time-frequency resources which should be protected by another base station, with no guarantee that the assignment will be indeed applied.

The limited support in 3GPP TS 36.423 Release 13 for central coordination has resulted in a high volume of measurement information, frequently above the up-link capacity of the VDSL base station backhaul.

In research papers appears the notion of network graph, presenting the wireless connection between different nodes as a visual characterization of the wireless network interactions.

As both the term "controller" and "coordinator" are used in the wireless industry, it is needed to clarify the difference between them: the "control" is defined as an activity to determine the behaviour of a network element. The "coordination" is defined as an activity to enable the efficient operation of the control functions, being situated at a level higher than the "control" of a network element.

BRIEF DESCRIPTION OF THE DRAWINGS

The drawings do not represent an exhaustive representation of the possible embodiments of the invention and the invention is not limited to the arrangements presented in the drawings.

The drawings are.

DETAILED DESCRIPTION

The following description is focused on the interactions between a Central Coordinator and different entities of a heterogeneous wireless deployment. The interactions include reports which enable better coordination of the wireless network operation. The interactions are defined so as to tolerate some delays which can appear in real deployments.

Coupling Loss and Network Graphs, as described in PCT patent application PCT/IB2016/054313, which was filed Jul. 20, 2016, and is incorporated herein by reference, are used throughout this description.

Embodiments of the invention are described hereinafter in conjunction with the figures.

The following description uses terminology familiar to those skilled in wireless cellular networks and in particular in LTE technology. This should not be considered as a limitation for the applicability of the invention to other similar technologies or to evolving cellular technologies.

eNB or base station denotes all types of base stations, using any technology, including macro, micro, femto or home base station, small cell eNB, relays, remote radio heads, in distributed or centralized architecture, including C-RAN architecture.

In this document an R-TP (Real Transmission Point/Radio Transceiver Point) or simply TP may indicate a non-virtualized part of a base station and also a non-virtualized full base station and may be named also "node".

A Central Coordinator is a software module placed on a base station, on a server located at the network edge (routers, etc.), on Internet, in the core network, in the Operation and Maintenance (O&M) system or on a virtualization platform.

A cell is a partition of space and frequency resources, identified by a cell identifier.

Figure 1:
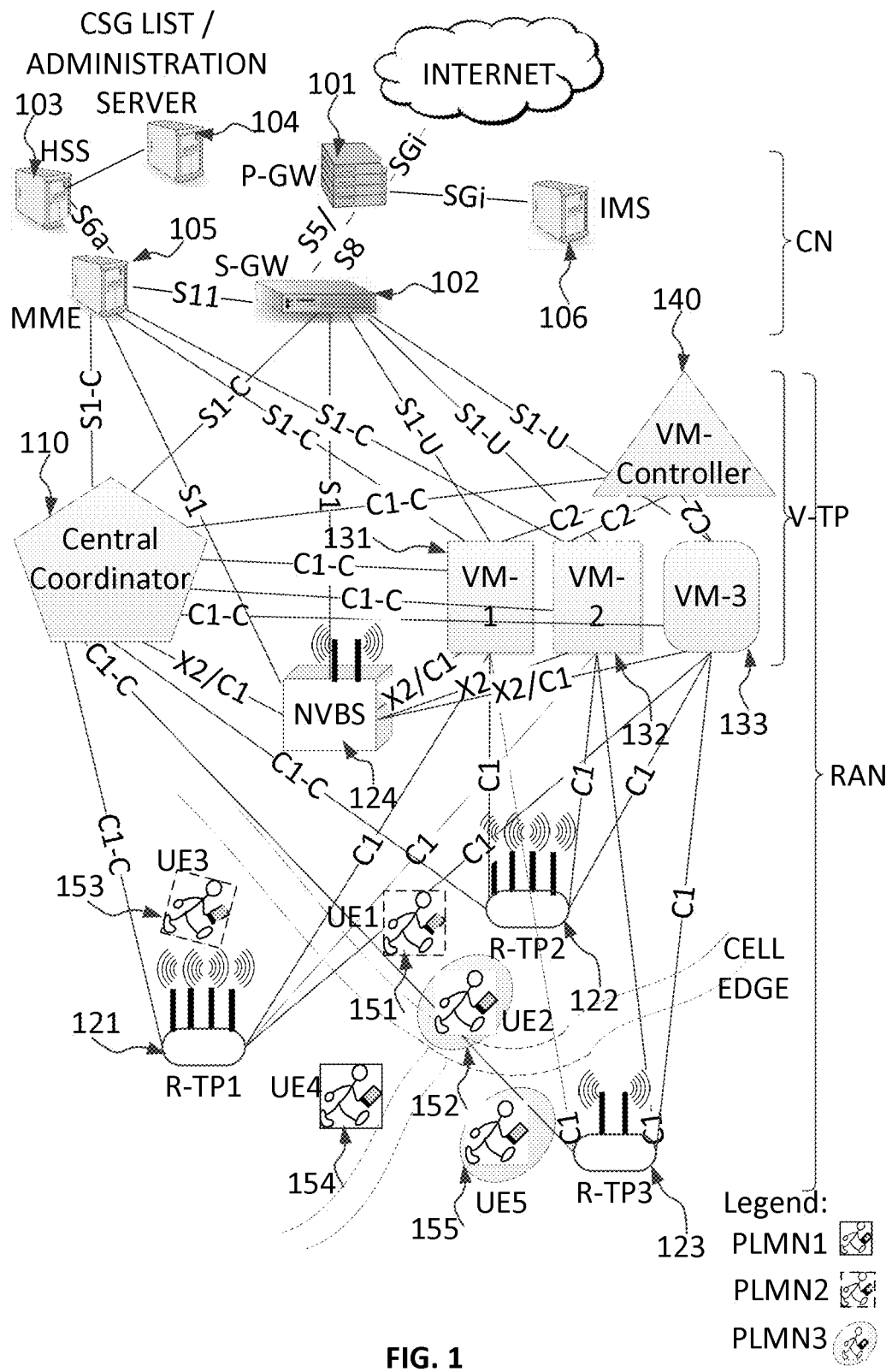
FIG. 1—Represents the system architecture
FIG. 2—Represents a user equipment block diagram
FIG. 3—Represents a base station block diagram
FIG. 4—Represents a computing platform.

The system architecture is described in FIG. 1, which includes the Core Network (CN) including P-GW-101 (Packet Data Network Gateway), S-GW-102 (Service GW, transferring user data between the Core network and the serving node), HSS-103 (Home Subscriber Server), the Administration Server-104, MME-105 (Mobility Management Entity) and the special IMS Server-106. The RAN (Radio Access Network) is represented by the Central Coordinator-110 (CCord), R-TP1-121, R-TP2-122, R-TP3-123, at least one legacy (non-virtualized) base station NVBS-124, the virtualized part of the one or more base stations (V-TP), including virtual machines named VM1-131, VM2-132 and VM3-134. The R-TP1, R-TP2, R-TP3, including antennas, are real transmission points or radio transceivers points of the one or more base stations. The base station NVBS-124 is also an R-TP, as includes antennas. The virtual machines are controlled by a VM Controller-140. The UEs, including UE1-151, UE2-152, UE3-153, UE4-154 and UE5-155 are connected over the air to the serving base stations through the Uu air interface.

While on each computing platform there is a Hypervisor in charge with computing resource management, we consider that is needed also a VM Controller, which controls the interaction between the wireless network and the Hypervisor of the virtualization platform.

The main task of the VM controller is the interaction with the Central Coordinator and with the R-TPs on one side and with the Hypervisor of the virtualization platform on the other side.

The user data plane S1-U from the S-GW goes to VMs, hosting a number of higher layer UE-related data processing functions and some of the associated control functions of the protocol layer. The routing of PDUs (Protocol Data Units) is done at the level of virtualization platform or per VM, to the destination R-TPs, identified by a TP-ID (similarly with BS-ID). The interface between a VM and R-TP is named C1 and transmits user data and radio control information.

In this way, some VMs host one or more of the RAN protocol higher layers related to the processing of the data for specific UE, and NOT related to one of the R-TPs. In this invention we prefer this approach given the relative long time and the load balancing problems related to migration of an UE from a VM to another VM, as is the case in handover. The VM migration takes place only in special cases, when is needed the VM migration to a different virtualization platform. A Virtual Machine handles the user data processing for one or more UE, for keeping the number of VMs scalable.

The traffic between S-GW and the serving VM, as well as the traffic between the VM and the R-TP should be tunneled; in an embodiment of this invention the same TEID (Tunneling End ID) could be used for all tunnels to identify the same UE.

In one of the embodiments, if the UE is new in the coordinated area, the CCord authenticates the UE, allocates the TEID for all tunnels and sends messages to S-GW and surrounding R-TPs including the TEID and also the UE IP address which was allocated initially by the P-GW. In this way the UE can retain the same TEID in tunnels going to different R-TPs.

FIG. 1 also indicates a "cell margin" area, where the power of the wanted signal and interfering signals are similar.

In uplink, the interference is created by UE transmissions and is perceived at the serving eNB or at the R-TP of a specific UE.

The wireless access network can coordinate itself in a distributed mode, through the existing X2 interface, basically described in TS 36.423. In the centralized mode, we consider a C1-C interface, which could be in the future part of the X2 interface or could be a stand-alone interface. As shown in FIG. 1, C1-C connects the CCord with the control functions within VMs, with R-TPs, with NVBS and with the VM Controller. Within the CN the CCord is connected to MME and in some embodiments also to S-GW.

Virtualization

Base station main functional blocks are PHY (Physical Layer) processing, Layer 2 processing including PDCP (Packed Data Convergence Protocol). RLC (Radio Link Control), MAC (Medium Access Control) sub-layers processing, Layer 3 processing (interactions with MME and S-GW through S1 interface, X2 interface), interaction with O&M (Operation and Management). In this invention the functions of Layer 1 and/or Layer 2 may be grouped in a different way.

Within the entire cellular network there is a clear separation between the control plane and user data plane.

In a virtualized approach, some functional blocks are moved on an external computing platform, consisting of processor(s), memory and eventual hardware accelerators. Parts of the processing resources of the computing platform are allocated to Virtual Machines (VM), where each VM has a defined functionality. The VMs are managed by a Hypervisor, for example Xen, KVM, VMWare, Hiper-V. The entire computing platform operates under an Operating System, for example Linux or Windows.

The computing platform can be located in RAN, i.e. on one of the TPs, at the edge, i.e. on a Router or on a standalone computer, or finally in the cloud.

For sake of simplification we will consider that the computing platform, hence the VMs and hardware accelerators, are located at the edge of the core network or access network.

Virtualization Platform Interactions with CCord

As already stated, the main task of the VM controller is the interaction with the Central Coordinator; below are examples of CCord or R-TP interactions with the VM controller.

Based on this invention, at installation, the VM Controller should be configured with the IP or Ethernet Address of the Hypervisor(s) and each R-TP or the CCord should be configured with the IP or Ethernet address of the VM Controller. The configuration is done either by O&M (Operation and Management System) or by the CCord.

Based on an embodiment, at first deployment an R-TP or the CCord contacts the VM Controller and asks for the activation of a VM; as part of the message the R-TP or the CCord may indicate the required number of processor cycles per sec, the size of the RAM and disk/non volatile memory. The VM Controller, depending of the actual used VM platform, can transmit these parameters to Hypervisor or may ask the Hypervisor to allocate multiple VMs (to accommodate the R-TP or the CCord requirements) or a combination thereof.

In response to this message, once the required resources were activated, the VM Controller will indicate to the R-TP or the CCord the IP or Ethernet address of the allocated VM and the actual allocated resources.

A variant of this procedure is that R-TP or the CCord will specify the usage of the VM, for example through a bit-mapped IE, in which each bit represents a function or a combination of functions, for example PDCP, RLC, MAC, CRC (Cyclic Redundancy Check), Scrambling, Turbo-coding, etc. to be executed on the VM.

During the operation the R-TP or the CCord will send messages to the VM Controller for obtaining the status of resource utilization (average and peak VM cycles/sec, amount or percentage of memory usage, HW accelerator usage, etc.). In response, the VM Controller will indicate the requested status.

During the operation the R-TP can go in a dormant state for some time. In this time the VMs should remain operational, as packets may arrive from the S-GW, but can work with reduced capacity. It should be noted that deleting a VM and activating the VM on another platform is a relatively long process; this mode of operation should be avoided.

In the moment that user data or control messaging (as paging) arrives for a user served by a specific R-TP, the VM will alert the R-TP, indicating the target UE.

If an R-TP or the CCord needs more resources on the VMs, it can send a reconfiguration message to the VM Controller. The VM Controller, based on the actual available resources on different platforms, could satisfy the request on the same platform or could migrate the VM. As the VM migration may be problematic (loss of packets, delays, etc.) at the moment of request, the R-TP or the CCord should indicate in the request if VM migration is allowed and in which conditions.

If the R-TP or the CCord request may be satisfied without migrating the VM, the VM Controller returns positive response to the R-TP or the CCord.

The VM Controller can establish the operational context of each controlled VM, such as one way or round trip delay, average and peak utilization of the allocated VMs, ingress/egress network traffic, average and peak memory utilization. This information can be transmitted to the associated R-TP or to the CCord at request or on a periodic basis (i.e. at fix time intervals).

The VM Controller can also indicate in a message the status of the entire platform, as overloaded, highly loaded, low loaded or on load percentages.

Based on this information, the VM Controller may request an R-TP or the CCord to reduce (if the VP platform is overloaded) the amount of required resources, for example by partitioning the functional modules between the R-TP platform and the VMs.

To this end the VM Controller may send to the R-TP or the CCord a message containing a new bitmap which indicates a lower number of offloaded functions to VM.

In case of low load of the VM platform, the R-TP or the CCord may send in a message a hypothesis, coded as a bit stream, for offloading more functional modules to the VM platform.

The VM Controller should set-up the software interface with the Hypervisor of each selected computing platform, to monitor the usage of VM resources, the latency between the R-TP and the allocated VM in both directions for each of the VMs or all VMs associated with a R-TP.

Routine Function

In an embodiment of this invention the routing function of the V-RP or of a VM sets a destination IP address and port/protocol based on the TP-ID provided by the CCord as an IE (Information Element) in its messages.

In LTE, he TEID is allocated for downlink by the base station and for up-link by S-GW; as in a network may be multiple MMEs and S-GWs and load balancing could take place between MMEs, implying core network intervention, in this invention the Central Coordinator may become the entity which in a given area provides the TEID for each UE. This will simplify the UE-specific interactions with the core network.

In the architecture in this invention the user data, after initial processing can be routed to one or more nodes, all the traffic being in downlink, as opposed to the existing dual-connectivity or network MIMO (Multiple-Input and Multiple-Output) solutions, where the user data is sent through the up-link eNB backhaul. The message from the CCord to VM will include identifiers of the target nodes (like TP-ID, R-TP ID or BS-ID). The VM Router will send the packet to the IP address of the corresponding R-TP or BS.

It should be noted that in this invention the VM Router brings some S-GW functionality to RAN.

Functional Partition Between the R-TP and Computing Platform

At the time when the LTE architecture was designed, the user data was directed to a single eNB at a time, such that it was a strong linkage between eNB and UE; this link was disturbed only due to handover.

In the last years the increased UE traffic has justified the study of approaches such as dual connectivity and network MIMO; however the limitations of up-link backhaul had to be considered and only dual connectivity was reflected in standards.

A real backhaul may have a 1:20 uplink/downlink ratio, creating a traffic asymmetry which negatively affects the uplink transport capability.

An additional characteristic affecting the performance when using functional split is the backhaul delay and jitter, which may be too high relative to the delay budget of the specific QCI (QoS Class Identifier) and to the delays of the radio interface.

Given the wired backhaul up-grade to VDSL (Very High Bit Rate Subscriber Line), the delay+jitter may be below 10 ms in a given region. At this order of magnitude it is possible to virtualize even the interactive RAN layers, such as RLC and MAC.

Part of the processing belonging to the LTE PHY layer, such as CRC calculation, coding and scrambling, does not add significant traffic so it can be also executed on the computing platform. As an argument to support the above view, in some standards coding and scrambling are considered parts of Layer 2.

The round trip delay affects the H-ARQ process and the ARQ process.

A possible approach is the separation between PHY and higher layers. In an embodiment of this invention the PHY Layer and some MAC and RLC functionality are located in R-TP, while the UE-specific data and control planes are "virtualized" to an external computing platform.

VM Functional Pipeline

The VM appears as a pipeline of functional modules. For example, the DL user data is processed in order in PDCP, RLC, MAC, etc. layers. Each layer may add a header containing a layer Sequence Number (SN).

In UL, the data is processed in the reverse order: MAC, RLC, PDCP.

In case that the packet resulting from a layer is too long relative to the length of an IP packet, is needed a segmentation, with segment numbering, for transmitting the data.

The last function in the VM DL chain shall be a routing function, with the following functionality:
  Inserts in the IP header the IP address of the target R-TP
  Sends a packet to CCord including the last LSN of each included Layer and the number of bytes in the UE specific queues, per UE and per QCI.
  The first function in the VM UL chain shall be a DPI (Deep Packet Inspection) function, with the following functionality:
  Retrieve the source IP Address and determine the R-TP ID of the last correctly received packet
  Retrieve the LSN of each included Layer in the last received packet
  Send a packet to the CCord including the retrieved information; in this way the CCord will be informed about the status of transmission/reception.
For detecting a bottleneck in the backhaul network, the R-TP should also send the count of bytes in R-TP queues.

User Data Plane and Control Plane

In wireless systems there is a clear differentiation between the data plane and control plane. In cellular technologies standardized by 3GPP, the control plane is referred to as "signaling" and take place at layer 1 (Physical Control Channels), layer 2 (RRC—Radio Resource control) and layer 3 (S1-C (control) and X2-C Interfaces.

The user data plane, named also user plane, includes the user data, connecting an UE to P-GW, while passing through S-GW. The IP packets in the user data plane use GPRS Tunneling Protocol (GTP), making possible to multiplex the packets to different UEs based on the TEID (Tunneling identifier) assigned to each UE. Additionally, the priority class of each packed is indicated by QCI (QoS class identifier). All packets marked with the same QCI form a bearer. An eNB groups the received packets per UE and per QCI, creating a queue for each UE and QCI. eNB flushes the queues in their priority order.

The eNB controller considers the status of all UEs for assigning resources for downlink or uplink transmission. Based on the assigned resources, the queue status, and in downlink based on the last reported CSI (Channel State Information) including CQI (Channel Quality Indicator) and/or RI (Rank Indicator), is created a Transport Block (TB) which is transmitted by the MAC Layer to the PHY Layer. For achieving this, the UE data received from the S-GW has to be first processed by the PDCP and RLC layers. It should be noted that the MAC Layer includes also control functions (sometimes called high level MAC).

MAC layer operation depends on the actual RAT (Radio Access Technology), for example UTRA, E-UTRA (LTE), 802.11 (WiFi) and can be different between the frequency bands, for example LTE frequencies lower than 5 GHz and 5 GHz (LAA—Licensed Assisted Access).

The TB, including both data and signaling, is further processed by the PHY layer. According to 3GPP 36.212, V12.5.0 (2015-06), in downlink the following PHY processing takes place in a sequential order:
a. Add CRC to the transport block
b. Code block segmentation and code block CRC attachment
c. Channel coding
d. Rate matching
e. Code block concatenation.

The next phase of data processing includes:
f. Scrambling;
g. Modulation scheme for generating a block of complex-valued modulation symbols,
h. Layer mapping
i. Mapping to resource elements.

The IFFT provides the analog values to be transmitted over the air.

For different RATs the processing may be different, while some operations can be very similar.

A similar processing takes place for the LTE PHY Control Channels.

Variants of Partition Between the Virtualized Platform and R-TP

Depending of R-TP capabilities, the following situations can be implemented:
A. S1 and X2—Virtualized B. PDPC—Virtualized; C. PDPC and RLC virtualized; D. PDPC, RLC, MAC virtualized; E. PDPC, RLC, MAC, and virtualization of one of more of: CRC adding to TB, Code block segmentation and code block CRC attachment, Channel coding, Rate matching, Code block concatenation, scrambling, F. None (i.e. no VM used), allowing to transmit the user data from S-GW directly to the R-TP.

The decision of which kind of partition should be implemented depends on factors like: available computing resources (computing cycles/second, memory) per VM, UE connectivity to one, two or more R-TPs, available backhaul capacity, etc.

For each kind of partition of the data plane operation, the messages of the C1 protocol should allow the transmission of specific control parameters and user data between R-TP, V-TP (virtualized part of the base station) and the Central Coordinator.

Central Coordinator

The Central Coordinator (CCord) executes the inter-node coordination functions for a cluster of nodes in a geographic area, including virtualized and not-virtualized base stations. CCord collects reports for deciding the behavior of network nodes.

The coordinated nodes may be TPs of a single base station and/or multiple base stations.

The inter-node coordination can address:
a. Load balancing
b. Mobility
c. Power levels of DL or UL transmissions
d. Time-frequency resource allocations for UE transmission, where time may refer to time-slots or subframes, while frequency may refer to a frequency channel, a group of frequency channels belonging or not to an operator, a sub-division of a channel (PRBs, subbands, etc.)
e. Time-frequency resource allocations for reference signals
f. Coordination of protected resources
g. Operation in Network MIMO transmission modes
h. Operation in multi-connectivity transmission mode
i. Medium access in un-licensed bands
j. Spectrum sub-licensing
k. Inter-operator infrastructure and/or spectrum sharing.

Below are detailed a number of messages supporting the above functionality.

C1 Interface

The first operation is the set-up of the C1 interface. Assuming that the CCord IP address is know from an O&M configuration or can be discovered, the C1 set-up will be initialized by each control block in a VM and by each R-TP.

At set-up interaction with CCord each VM should include its identifier and its capabilities in terms of supported UE IDs (it should be an UE identifier at a level higher than C-RNTI (Cell Radio Network Temporary Identifier), possibly an X2 UE Identifier, supported layers and supported functionality. The message can be built as a bit-map (string) or as enumerated entities.

A special situation is when the MAC control and/or RLC control is split, i.e. part of control functions are done in R-TP, part in VM and part in CCord.

Below are some examples of control messages sent by the different nodes in the network.

Messages Regarding the Functional Split of Control Functions

The functionality of each MAC, RLC, DHCP and RRC (Radio Resource Control) protocol layers is specified at this time in respectively 3GPP TS 36.321 V12.6.0, 2015-06, TS 36.322 V12.2.0, 2015-03, 36.323 V12.4.0, 2015-06 and TS 36.331 V12.6.0, 2015-06.

For supporting the control partitioning, in an embodiment CCord transmits to the base station or to the VM the list or bitmap of the control channels to be supported by each control entity in the R-TP or in the VM. The list can be provided separately per protocol layer and can include only partial information, to be specified. For example: DCI (Downlink Control Information) sent in LTE over the air to UE, may be composed from information provided by CCord, such as time/frequency allocations and maximum transmitted power, however the modulation and/or coding scheme can be selected by the R-TP, in line with real-time wireless propagation channel fluctuations. Other examples when CCord specifies partial control information are the System Information Blocks, where part of information can be configured by O&M and part of information can be dynamically configured by CCord.

In such a partition case, a bitmap or a list of IEs (Information Element) will indicate to each VM or R-TP which are the IEs provided by CCord.

In the actual operation, a message sent to each R-TP or by IP multicast will indicate the actual control data to be provided to MAC or PHY layers for transmission.

In an embodiment, a correlation IE should be provided such that the R-TP will know the relation between the received TB (Transport Block, carrying user data and eventually control data) from the VM and an allocated time-frequency, power, modulation scheme and transmit mode to be used by R-TP.

The correlation information should be sourced by CCord and transmitted to the R-TP together with the allocation information and transmitted to the VM together with the indexes of the logical channels assigned to be included in a TB which will be transmitted in that allocation.

In such a case the correlation information may be part of the message header.

Alternatively, both the R-TP and VM receive from CCord messages instructing which logical channels or data radio bearers to be included in a TB are. The TB will be transmitted in a specific time-frequency resource. If the partition is such that the MAC is executed by R-TP, the index of RDB (Radio Data Bearer) and the index of the control channels have to be included in the VM-transmitted packet headers.

R-TP will execute a DPI (Deep Packet Inspection) for determining which logical channels are included in a packet or TB and will transmit the TB in the assigned resource or will forward the packet to the suitable queue.

Because the TB is formed by concatenating different RLC segments, the resulting block may be too long for an IP packet. So each segment or few concatenated segments shall be sent from/to VM to R-TP as one IP packet.

HARQ and ARQ

Another example of partition is related to handling of HARQ and ARQ processes; given the possible inclusion of RLC and MAC layers in VMs, the type of redundancy (how many retransmissions) can be provided by the CCord. The actual TB building, such to include in the MAC or RLC header the retransmission index, can be handled by R-TP. With other words, the VM may provide only one block of data per R-TP, while each R-TP may build for itself the redundant versions with the appropriate header. This involves that in an embodiment where the redundant packets are built by the R-TP, adding the CRC to the TB is a function of the R-TP.

Another possibility of functional partition is that the VM provides all the possible CRCs, one per re-transmission, but only one data packet. The R-TP does not compute the CRC by itself, but appends at each retransmission the suitable CRC.

In relation to ARQ, the UE sends a status report indicating the missing packets or fragments. This information arrives first at R-TP and may be forwarded to VM. The R-TP or the VM, based on the stored information, can build the TB for re-transmission. If the VM does this, the delay is higher.

CCord, function of real-time delay and jitter measurements and also based on information regarding the VM loading and processing delay, can decide where the TB formed with the packets due for retransmission is formed: at VM or at R-TP.

From the above discussion results that a message should be transmitted by the VM or by the VM platform controller to the CCord, indicating the delay and jitter between virtualized UE-specific entities (RLC, MAC, PDCP) and each relevant R-TP. For reducing the amount of information, in case that multiple UEs are handled in the same VM, the CCord should be provided by the VM Controller with the information, for each VM ID (VM Identifier), of the processed UEs per VM. In such a case, the delay, jitter and load information can be provided per VM.

Use of Resources

An R-TP or a base station can report to CCord the use of resources per cell as a summary or per selected granularity of the time/frequency resources.

Each R-TP or base station or UE report to the CCord (Central controller/coordinator) the supported cells, by indicating their central frequency (in kHz/MHz or as a code) and the channel bandwidth (in kHz/MHz or as a code).

Scheduling and Reporting Granularity

For example, in LTE the scheduling granularity is in general 1 ms (subframe duration), while the frequency granularity is a PRB (physical resource block) or a subband or a full channel.

To transform this information in a RAT-independent mode should be mentioned the time granularity e.g. 1 ms, 0.9 ms, LTE_full_subframe, and the frequency granularity (e.g. 180 KHz, LTE_PRB, LTE_Subband, LTE_reduced_subband, etc.).

Alternatively, the subframes could be, as in LTE, defined by the system frame number and the subframe number. This allows, for synchronized networks, a practical good time reference based on the absolute time.

Total Number of Resources Per Cell

The total number of frequency resources per cell is indicated while using one of the possible frequency granularities.

Another information of relevance is the number of transmit antennas and the number of receive antennas.

Summary of the Resource Usage/Availability Per Cell

The summary of the time-frequency resource usage can be reported to CCord based on a number of steps as:
  Number of used non-restricted resources, i.e. the resources which are not restricted from p.o.v of transmitted power or non-protected resources;
  Number of fully restricted resources (or fully protected resources), i.e. resources with transmitted power below a threshold;
  Number of medium restricted resources (or medium protected), i.e. resources below a second threshold higher than the first power threshold.

The summary of the available resources per cell, necessary for node selection or scheduling, can be presented as:
  Number of available non-restricted resources, i.e. the resources which are not restricted from p.o.v of transmitted power;
  Number of available fully restricted resources, i.e. resources with transmitted power below a threshold;
  Number of available medium restricted resources, i.e. resources below a second threshold higher than the first power threshold.

Function of the number of defined power levels (as absolute value, relative value, thresholds) the resource usage/availability per cell may also have more or fewer steps.

The resource usage/availability for different power situations can be presented also as a percentage of the total resources.

Detailed Resource Usage Reporting

The detailed resource usage or the detailed available resources can be reported as a bitmap in time frequency domain, where for each time-frequency resource is reflected the type of resource, for example: available or used, fully restricted, medium restricted or not restricted.

Protected Resources in LE (License-Exempt) Bands

The LBT (Listen Before Talk) in WiFi, used also in LTE mode named LAA (Licensed Assisted Access) is also a form of protection, given that only one transmitter on a channel will use the channel when the received signal is higher than a threshold. In case that such a transmission takes place, the other potential transmitters shall use the resource in a fully restricted mode.

The available resources are those in which the level of energy is under the LBT threshold in a defined percentage of operating time.

Allocation of Time-Frequency Resources

Allocation of time-frequency resources to a specific UE will include some of the IEs indicated below:
  a. The identifiers of R-TP and UE
  b. DL or UL
  c. In some embodiments per UE application or differentiated between control and data
  d. Per allocated frequency channel:
     i. Allocated time-frequency resources (per subframe and (PRB, group of PRBs, subband, etc. or as a bitmap of frequency resources per subframe)
     ii. If persistent scheduling, the repetition interval in time domain
  B. Allocation of power resources (DL or UL) for a specific UE will include some of the IEs indicated below:
  a. The identifiers of R-TP(s) and UE
  b. DL or UL
  c. Per UE or per UE and QCI groups; two or more QCI groups can have the same allocated power
  d. In some embodiments per time and/or frequency dimension The following information should be included per allocated frequency channel:
  a. Allocated time-frequency resources per subframe and per one from the list of (PRB, group of PRBs, subband, etc. or alternatively as a bitmap of frequency resources per subframe
  b. If persistent scheduling, the repetition interval, in time domain, of transmissions
  c. The power level, indicated as zero power (muting), or indicated relatively to one or more predefined thresholds, or indicated as maximum power, or derived based on a request for the protection of time-frequency resources in another cell.

The power level may be below a threshold in inter-cell interference coordination.

The size of the time-frequency resource shall be communicated by the CCord, through an IE, also to the RRC layer in a VM; based on this and also on the selected modulation scheme the VM can build a TB.

The CCord makes its scheduling decisions based on information including:
  a. Buffer status per UE and QCI, as reported by UE serving VM or by R-TP;
  b. Power headroom reporting—from R-TP for itself or for the served UE;
  c. RLC mode type as recommended by RLC: transparent, unacknowledged and acknowledged.

Summary of Network Graphs Based on Coupling Loss

Given the use of Coupling Loss in the following description, we provide a short summary of the main principles in the patent application PCT/IB2016/054313 filed Jul. 20, 2016.

Each vertex in the network graph represents the attenuation of the signal transmitted by an antenna, presented in a linear form. For obtaining the attenuation is needed to use the measured power of the received signal. The attenuation is obtained by dividing the power of the received signal, as reported by the receiver, to the power of the transmitted signal, as reported by the transmitter. The received signal from a single source can be estimated from reference signals, for example CSI-RS non-zero-power and zero-power in LTE or preambles in WiFi.

When the power of the future transmitted signal is known, it is possible to compute the power of the resulting wanted signal by subtracting from the power received from a non-zero reference signal the power in a muted (zero power) reference signal.

The total interfering power can be computed by summing the power of the interference power from each relevant transmitter and taking into account its statistical behavior.

The statistical behavior of the received signal from each transmitter together with receiver parameters can be used for deriving the expected CQI (Channel Quality Indication) or the MCS (modulation and coding scheme) for a given probability of error. In case that the receiver parameters (noise factor, demodulation error, etc.) are not known, it is possible to calibrate the system based on the CQI estimated by an UE used as receiver in given interference conditions.

Allocation of Modulation Scheme

The allocation of modulation scheme, a MAC Layer function, can be done based on CSI/CQI reports or based on the MCS (Modulation and Coding Scheme) deduction from the interference graph.

CCord can allocate the modulation scheme only or the full MCS (including the coding rate) based on the last CQI reports from UE. It should be noted that the CQI assessment by UE takes into consideration also the wireless channel statistics, firstly because it cannot be separated from the SINR measurements and secondly because it is requested by standards to report the lowest CQI for a 10% error rate.

When using Network Graphs, the statistical channel information can be assessed in several modes, where the modes using R-TP or UE reporting require messages from UE or R-TP to CCord:
  A. Inferring it from the historical variations of the parameter represented by the edge line of the network graph, i.e. the coupling loss;
  B. Reported by the UE as mean and variance of the coupling loss over a time interval;
  C. Reported by UE as representative points of the CDF obtained through measurements of the coupling loss, for example mean, median, 90%, 95%;
  D. Reported by the R-TP as mean and variance of the coupling loss over a time interval;
  E. Reported by R-TP as representative points of the CDF obtained from UE reports of the coupling loss, for example mean, median, 90%, 95%.

CCord can configure the timing of the reports (periodical interval or at request).

Based on the statistical properties of the coupling loss and also based on the assessment of background interference levels, to be reported by UE, CCord can assess the MCS or only the modulation scheme for new combination of transmission powers.

While the above description refers to DL, in a similar mode can CCord can assess the MCS or only the modulation scheme for the uplink or for D2D (sidelink).

Based on time-frequency allocation and at least the modulation scheme, an R-TP or a VM can calculate the size of the TB and, if needed, the coding rate.

Partition of Responsibility for Resource Allocation

The resource managed by CCord can be only part of the total available resource; in this case a message should be sent to the involved R-TPs indicating by a bitmap the time/frequency pattern PRBs or groups of PRBs or subframes or frequency channels or groups of frequency channels (repetitive or not) of resources reserved for the central control by CCord.

CCord can allocate first the time/frequency and power resources to UEs having prioritized packets; the first allocation can be done in such a way to minimize the DL or UL interference between these resources.

Handover

Handover (HO) involves changing the serving R-TP for a given UE. This action is initiated by UE or by the network.

In the existing LTE architecture, after being instructed by the serving eNB, a UE attempts to associate with the target eNB; once the handover finalized, the target eNB informs the MME, over the S1 interface; the MME commands the S-GW which will send the user data to the target eNB.

In our architecture the CCord can initiate the handover. If the serving R-TP has initiated the handover, the serving R-TP announces the CCord.

In case that UE is served by multiple R-TPs, the UE can remain connected and receive/transmit data to one or more R-TPs during the HO process.

In all cases above, CCord asks the VM serving the UE or the Routing function through a message to stop sending data and control information to the old serving R-TP; the incoming user data will be buffered on the computing platform. CCord will establish which are the new target R-TPs and will send a message to the specific serving R-TP(s) for connecting to those target R-TPs and to transfer the data and/or the control information which was buffered in the meantime. Alternatively, the buffered data can be transferred from the user serving VM to the target R-TP or base station.

It should be noted the particular case when the HO implies an R-TP of a virtualized base station and a non-virtualized base station, while the user data of the UE passes the virtualization platform. Using the protocol layer splitting allowing no processing of UE traffic on the virtualization platform, suitable for the NVBS, it is possible to execute the HO between base stations with no involvement of the S-GW.

Energy Consumption (Energy Graph)

The traffic scheduling should be done in such a way to minimize the overall energy consumption.

When selecting a serving node, CCord needs to consider the overall consumed energy; for example, blanking of time-frequency resources will reduce the energy consumption of both the transmitting node, as can use higher MCS, and of the blanking node, which will transmit zero power. This energy reduction will be done by spending more spectrum, such that in practice may not be always possible.

For an UE in the active state the transmission-related energy consumption, excluding the energy required by the general computing, will depend mainly on the radio used power and the time of transmission.

For an UE the relevant parameters are:
a. Total transmission power on all the used antennas
b. Time of transmission.

So for uplink should be selected serving radio nodes with the lowest path loss or coupling loss and time-frequency resources less affected by interference.

The serving eNB can schedule the actual resources for transmission, while the CCord can coordinate resources to be used in Network MIMO or multi-connectivity; in the last case is not needed that the transmissions to different radio nodes will be executed in the same time.

For the network to UE transmission there are more parameters which can influence the receiving radio node selection and the appropriate RAT.

For example in a heterogeneous deployment the macro base station signal may be stronger than a small cell signal, however the energy cost for transmitting the same throughput can be much higher for a macro base station due to:
    air conditioning
    losses in cables between the base band enclosure and the antennas
    higher distance to UE
    powering up or down a specific radio node.

For providing an energy-efficient solution, the radio-node selection by CCord should consider parameters provided through a message by the base station or by the radio node including:
    the background (due to computing and air conditioning) consumed power
    the consumed power for each additional W of radio transmission.
    the consumed power for powering-on the radio node.

The base station or the CCord should assess, for each potential radio transmission node, the needed transmit power based on:
    A. Transmission power of the reference signals
    B. UE measurement reports (RSRP, RSRQ, CQI, MIMO rank, etc) or based on the network graph assessing the CQI and MIMO rank.
    C. the energy cost of powering up a radio node.

In addition, different RATs may have different peak-to-average properties which influence the consumed power, so the assessment should be done per RAT. Also the operating frequency influences the transmission power, such that the evaluation should take into consideration the suitable cells.

Of course, the smooth mobility and coverage requirements may justify spending more energy, such that this aspect should be also considered when selecting the radio transmitting or receiving nodes.

Based on the overall evaluation, the CCord will assign through messages the radio node(s) for serving the UE, the CoMP mode, the operation of the VM router or S-GW, through MME or directly.

UE Service Requirements and Radio Node Selection

An UE may run in the same time different applications, each one having different service requirements. Not all the available RATs will be able to satisfy all the service requirements of the different applications running on an UE.

Each application may work with multiple parallel threads, while only part of the application threads may have special requirements on delay, throughput/user perceived throughput, resiliency, security, QoE (Quality of Experience).

For allowing suitable routing to a radio node and scheduling of the transmissions, the application should indicate through a message to the controller the radio node or to CCord which are the IP addresses (including port or protocol number) of the relevant application server and/or client IP addresses, and for each IP address which are the requirements (average throughput, resiliency level, eventually maximum and or minimum throughput, average, minimum or maximum delay) apply for this address.

In the defined messages the actual IP address can be replaced by an identifier.

Alternatively, if a device behind a radio node is not identified by an IP address, but by a text having a known location in a protocol message header, the text length and the location in the protocol header should be either fix or indicated by an IE (Information Element) in a message, together with the associated requirements.

An UE should provide, through a message to the radio node controller or to the CCord or to an entity in the core network (MME, Gateway), an overview of its requirements, considered valid until changed, by grouping the requirements in classes (each class being identified by an index), indicating the traffic for each class and indicating the addresses (IP or text-based or identifier-based) of the transmitters and/or receiver associated with each class.

The classes can be built based on technical requirements or based on Network Slices.

A base station or a serving radio node can further combine the traffic requirements from different UEs before reporting them to higher hierarchical network controllers, like CCord, or to control (MME) or user-plane (gateways) entities in the core network or to the OAM system.

The role of the network controllers, as CCord, is to analyze these requirements and to assign the suitable radio nodes for uplink and/or downlink communication for each mentioned address.

For example, a road safety application may require a latency of max. 5 ms and a throughput of 100 Mb/s for transmitting un-compressed video to a car, the un-compressed video being generated by a camera connected to a video server located in the nearby of the road, and connected to an entity at the edge of the access network. In the same time the UE in the car may receive infotainment traffic from a server in a cloud, with a latency requirement of 100 ms and a data rate of 20 Mb/s.

The UE sees a number of base stations and R-TPs, but not all of them are suitable for transmitting the low-latency traffic. The CCord instructs either the S-GW (directly or through MME) or the VM (Virtual Machine) where the user data is pre-processed to route the low latency traffic, identified by the UE IP address and port/protocol, to the best available radio node which supports a RAT able to support its requirements of latency and traffic throughput.

In addition, CCord can select the appropriate cell or, if Carrier Aggregation is used, cells, for serving this demanding traffic. The non-demanding control information may be identified by another address and routed through the same or a different radio node.

The infotainment traffic can be routed to the same radio node or to another one; the traffic may be identified by UE IP address and the used ports or alternatively by the infotainment server IP address.

In the above example the relevant video camera can be selected by the application server based on the position of the car and the car moving direction. The video camera can be named by including its mounting place and direction, for example "Camera on street Central no. 123 direction Nord-South". This text can be used as a field (IE) in a message for routing its traffic to the serving radio node.

For implementing the actual traffic routing, a DPI (deep packet inspection) function should be supported by the S-GW or by the VM or the VM platform.

Estimation of Transmission Power and Available Capacity Per UE

When attempting to find one or more serving cells for a specific UE is needed to assess the match between the RATs and frequency bands supported by both the UE and the potential serving radio nodes.

The next step will be to determine the throughput or capacity required by the active applications and their QoS/QoE expectations.

Alternatively, based on the available resources in the radio nodes, the UE can be informed by the CCord which is the capacity of the access network for different classes of traffic. In turn, the UE can inform each application server on the possible throughput and delay.

For the matching relevant cells, separately for downlink and up-link, based on the number of the independent radio chains supported by UE and the interference graph or based on the measurements indicating the CQI and the MIMO rank when single-user MIMO or Network-MIMO is applied, it should be determined:

What is maximum user throughput and the delay that can be achieved in each relevant cell while using fully protected resources;

For the remaining traffic should be determined what is maximum user throughput that can be achieved in each relevant cell while using medium protected resources and which is the feasible delay, in single-user MIMO or Network-MIMO modes;

For the remaining traffic:
How many physical resources are needed in the un-restricted transmission mode;
What inter-cell CoMP procedures can be applied by using resources in other radio nodes, for example: Network MIMO A message should be transmitted to the radio node controller and/or to the CCord indicating the throughput (capacity) which can be scheduled per UE in each category of resource protection and which is the delay associated with each category.

In response, the CCord can make the actual radio node allocation for serving each type of traffic of the UE and send messages to the VM serving the UE and to the serving radio nodes.

Paging

The UE will identify a number of R-TPs more suitable for communication and will transmit, through a message to one of the R-TPs, the list of the suitable R-TP IDs. This list will be forwarded by the R-TP receiving the message to CCord.

CCord decides one or several R-TPs to which the UE-associated VM transmits the paging messages and transmits the information firstly to the VM routing function and secondly to all involved R-TPs.

Broadcasting

The broadcasting from the virtualization platform can be directed to all R-TPs in an area or only to a number of selected R-TPs.

The CCord send through a message the list of relevant R-TPs to the UE-associated VM, such that the VM transmit the broadcast-related messages. As part of the message header should be added the intended absolute time for transmission.

CCord also instructs the target R-TPs on the required service and provides the time-frequency allocations for transmission.

Transmission Modes

CCord can also establish the transmission mode (TM) in a specified time-frequency resource.

An IE is needed for including the TM index in a message including the time-frequency information.

In case that separate messages are used, is needed a correlation information (assignment or allocation ID) to be included in different messages.

Multi-Point Transmission

The multi-point transmission to an UE can use the same time-frequency resource for the involved nodes, exploiting the special properties through MIMO operation or can use transmissions using different time-frequency or frequency resources, with Carrier Aggregation (CA) or a combination thereof.

In the CA mode, the TBs to be transmitted on different carriers can include data or control information from one bearer, from multiple bearers or from a part of a bearer.

CCord will allocate the time-frequency resources and will control the bearer allocation per R-TP.

A correlation IE should be provided such that the R-TP will know the relation between the received TB and an allocated time-frequency, power, modulation scheme and transmit mode.

The correlation information should be sourced by CCord and transmitted to the R-TP together with the allocation information and transmitted to the TM together with the index of the logical channels assigned to be included in a TB which will be transmitted in that allocation.

In such a case the correlation information may be part of the header.

Alternatively, both the R-TP and VM receive messages instructing which the logical channels or data radio bearers to be included in a TB to be transmitted in a specific time-frequency resource are. The transmission process was described above.

Network MIMO (NetMIMO)

CCord can use the network graph to assess which R-TPs are suitable for network MIMO; the criteria can be different for CS/CB (coordinated scheduling/beamforming) as compared with multi-layer approach targeting increased data rate.

As it can be found in literature, the measurements demonstrate that the correlation between different antennas is low in NLOS conditions, enabling high MIMO gains. A high coupling loss between a UE and R-TP may indicate a NLOS condition with inherent higher delays. The high coupling loss can be correlated with the GPS coordinates or with positioning technology using positioning reference signals (PRS), on which is possible to compute the actual distance. High coupling loss and low actual distance indicate a NLOS condition.

At the same time a first UE can be in NLOS condition, i.e. with high coupling loss, while a second UE can experience a low coupling loss. This means that the transmission to the second UE will not create significant interference to the first UE, such that is possible to use CS/CB.

Based on the coupling loss between the transmitting nodes and the target UEs CCord can select the wireless nodes to transmit in the same time-frequency resource and their transmission power.

In case that the CCord has detected a condition favorable for Network MIMO, the CCord will allocate the same time-frequency resource for network MIMO to the cooperating R-TPs fulfilling the same condition and will send a message to the selected R-TPs indicating a transmission mode for Network-MIMO, the R-TP IDs, the C-RNTP or other UE-ID, the time-frequency resource as detailed above, the starting subframe for data transmission, the subframe or the more general time-frequency resource pattern for data transmission, the antenna ports to be used for transmission and eventually the end of validity for this allocation. The message can include an identifier for this allocation, identifier to be used also in the communication of the CCord with the VM associated with the UE.

In addition, the CCord should take additional measures for avoiding collisions between the REs (resource elements) used for reference signals and the REs used for data, given the fact that the mapping of the reference signals can depend on CellID. Such a measure can be allocating a common CellID for the time-frequency resource used in Network MIMO, such that the mapping of the data will be identical for both R-TPs. This Cell ID can be identical with the CellID of one of the cells or can be a new parameter used in the mapping of REs used for data and eventual of the REs used for some control channels. The selected parameter used for mapping will be transmitted as an IE in a message to the R-TPs involved in NetMIMO.

Another issue deserving attention is the avoidance of collision between the PUCCH used by each R-TP. If the PUCCH is spatially multiplexed, the same resource can be allocated for all the involved R-TPs. If this is not the case, only one R-TP shall transmit at a time, all the colliding ones being muted.

The CCord shall transmit a message with an IE indicating the uplink mode of PUCCH allocation and the reserved time-frequency resources.

Another CCord message will instruct, in downlink, the VM used by the UE to send the same TB to all involved R-TPs or to send different TBs to the selected R-TPs, function of the selected NetMIMO mode. The message should include in addition to the NetMIMO mode the size of the TB and the time-frequency allocation ID.

Function of the lower layers actually implemented by the VM, the VM will create data packets toward the selected R-TPs, including a field to indicate the allocation ID. The R-TP will send the packet in a queue intended for the assigned time-frequency allocation.

In uplink, the interference graph can indicate in a similar mode the UEs suitable for MU-MIMO. The CCord will send a message to the selected R-TP or VMs indicating which UEs can be scheduled in MU-MIMO mode.

The Net-MIMO transmit modes can include a high variety of modes. One of them can be used for interference cancellation at cell edge. Let's refer to FIG. 1, where UE1 receives DB1 (data block one) from two of the four antennas of R-TP1 and UE2 receives DB2 (data block two) from two of the four antennas of R-TP2. In addition, R-TP1 creates interference to UE2 reception and R-RTP2 creates interference to UE1 reception.

A Net-MIMO mode can comprise interference cancellation. For example, each remaining antenna of R-TP1 could transmit a signal which is essentially DB2, but which is rotated (phase shifted) and adjusted in power such to cancel the interference induced to each antenna of UE1.

The network graph can be used for finding the coupling loss between R-TP2 and UE1; this coupling loss can be used for computing the transmit power of the interference cancellation signal. The suitable precoding index for each of the interference cancelling antenna can be provided by UE1, i.e. by the UE affected by interference.

We should observe that in LTE we have 8 transmitting antennas and 4 receiving antennas. The reference signals for the desired signal shall be separated in time domain from the reference signals used for interference cancellation. A special configuration should be used for determining the precoding for the interference cancellation antennas, in which at a time transmit only the antennas creating interference and the antennas dedicated for the cancellation of this interference.

In total, will be needed three phases for determining the precoding required for the 8 transmitting antennas.

The CCord will also transmit a message to the interfering R-TPs, indicating a transmission mode for Network-MIMO, the R-TP IDs, the C-RNTP (see above) or other UE-ID, the time-frequency resource as detailed above, the starting subframe for data transmission, the subframe or the more general time-frequency resource pattern for data transmission, the antenna ports to be used for transmission and the antenna ports to be used for interference cancellation and eventually the end of validity for this allocation. The message can include an identifier for this allocation, identifier to be used also in the communication of the CCord with the VM associated with the UE.

The CCord will configure the VMs associated with each of the two UEs to transmit the same TB to each of the involved R-TPs. The IEs for coordination of the VMs should include in addition to the NetMIMO mode the size of the TB, the allocation ID and the TP-ID to which the packets should be transmitted.

Function of the lower layers actually implemented by the VM, the VM will create IP packets toward the selected R-TPs, including a field to indicate the allocation ID. The R-TP will send the packet in a queue intended for the assigned time-frequency allocation.

Beamforming

The CCord can assess the possible MCS, while considering the processing gain achieved after coherent reception and the background interference which can be calculated based on the network graph.

In case of beamforming, same TB will be sent by the virtualization platform to all R-TPs selected by CCord. In addition, the redundancy-related operation will be executed as explained above.

MIMO Channel Correlation Factor

The MIMO channel correlation above a certain limit conducts to the need of joint MIMO processing. This implies that the routing function of the VM will transmit by dedicated IP messages or by IP multicast the same user data, together with the indication of the assigned resource for transmission as established by CCord, including also a precise time indication, to the radio nodes involved in MIMO joint processing.

For each MIMO channel it should be added in the messages the information representing the correlation factor of the MIMO channel relative to all the other MIMO channels relevant to co-located antennas or alternatively the MIMO rank and the need for joint processing.

The CCord sends a message to each of the relevant radio nodes indicating the specific position in time/frequency domain of the reference signals for the involved antenna ports in each radio node, and eventually the blanked resources, to be used for assessing the channel correlation or the MIMO rank or the need for joint MIMO processing.

As the position of the reference signals may be technology-specific, it will be needed that during the evaluation of the channel correlation, MIMO rank and of the needed precoding the overlapping time-frequency resources in the other involved technologies will be muted (zero power).

The MIMO channel correlation factor should be assessed for each receiving antenna of a signal from each transmitting antenna and reported through a message (signaling) to the radio node transmitting the signal.

The radio node can further aggregate the information in a matrix or a bitmap which can be transmitted to the CCord through a message. Each bit or group of bits in the bitmap will represent the channel correlation or the MIMO rank for a group of antennas, representing the Network MIMO. The channel correlations can be represented relative to one or more thresholds, for example lower than 70% or equal or higher than 70%.

Additional thresholds can be added.

The message shall identify the transmitting antennas through the identifier of the transmitting node and the port numbers of the transmitting antennas, and the receiving antennas through the identifier of the receiving node and the ports of the receiving antennas. Alternatively, the position in the bit map can indicate the antenna ports.

Coordinated Same-Time Transmissions in Un-Synchronized Systems

The LBT (Listen Before Talk)-based systems will not start the transmission based on a scheduled approach, such that the absolute time or derived time reference cannot be used. The same happens when the different transmitters are not synchronized one to each other.

While based on LBT principles there is only one transmitter at a time, the network MIMO or other forms of CoMP (Cooperative Multi-Point) can still be implemented based on the medium acquisition by one of the transmitters involved in CoMP.

After the end of the previous transmission one of the radio nodes which are part of a CoMP group (for example ReNB3) acquires the medium. At the beginning of transmission or later on it sends a special signal or information which allows determining its identity. For example LTE can send a cell identifier while 802.11 can send the source address as part of the MAC header.

The CoMP group is formed under the control of the CCord, which sends messages to each of the radio nodes for informing it which are the other radio nodes involved in CoMP.

When another radio node in the same CoMP group (the above message may also include the identity of the CoMP group) receives the signal or the identifying information, based on a message including a priory defined time difference between the transmission of the signal or of the information and the start of the CoMP operation, this radio node may start its transmission following the rules of the established CoMP operation.

The start of transmission may be conditioned in some frequency bands by the LBT (Listen before Talk) mechanism. If the medium is free, given the relatively high LBT energy threshold, coordination of transmissions can still avoid interference at receiver.

If the medium is busy, and a radio node in the CoMP group detected an energy higher than the LBT threshold produced by another node in the CoMP group, the LBT can be disregarded and the radio node can start the transmission, because by applying CoMP the reciprocal interference will be avoided.

The a priori defined time difference may be transmitted from CCord through a message which may also include the type of CoMP operation (Network MIMO-joint processing, Network-MIMO coordinated scheduling, power limitation of some transmitters in specified time-frequency resources, etc.)

The coordination of transmission can be also done in a distributed mode, by sending the same type of messages from a transmitter to the other transmitters.

Traffic Aggregation and Routing

For more efficient backhaul use and faster scheduling the traffic should be aggregated, both in downlink and uplink.

The existing approach of tunneling per QCI (QoS Class Identifier) has the advantage of fast mapping of the existing DiffServ traffic marking (RFC 2474) to QCI. However there is no concatenation of the small packets over the backhaul.

In downlink, the virtualization of the user plane can allow the concatenation of the small packets targeting the same UE and originating from different application servers and having the same QCI into a single packet having as destination the UE serving radio node. The de-concatenation can be done at the transmitting radio node or at the UE.

In uplink, the concatenation can be done by the UE or by the receiving radio node. In case of user plane virtualization, the virtualization platform can concatenate the packets with the same CQI which are intended to the same application server.

QoS Based Tunneling

The DifServ marking, which today is used for QCI-based tunneling, does not correspond anymore to the new QoS requirements, which can be by far more stringent than those specified in 2015 for QCI. For example, the minimum delay can be in the order of few milliseconds, while in 3GPP TS 23.203 the minimum delay is 60 ms.

In case of user plane virtualization, based on DPI searching for specific addresses, it is possible to identify the packets which have more stringent delay requirements than DiffServ/QCI marking. Those packets can be tunneled to the serving radio node with a new QCI marking, identified in the packet header by specific bit(s), corresponding to the new QCI (or a new name).

Alternatively, the DPI should be done at the serving radio node for identifying the traffic with more stringent new requirements, based on a list provided by UE, OAM or CCord through appropriate messages.

Network Slices

Essentially each network slice has its own billing model.

The assignment to a network slice should be done based on the address of the application server or, in case of proximity services using dedicated radio nodes, based on the address or ID of the serving radio node.

The UE or the serving radio nodes or the serving VM should send with a message the IP addresses (including port number or protocol number) or addresses associated with a text (name) of each application server or with one or more dedicated ports of the radio node as allocated by the controller of the radio node or as configured by the OAM system, to the entities counting the traffic associated to a specific network slice:
 A. Core network elements in charge of billing and routing
 B. VM processing the user data
 C. Radio nodes The entities counting the bytes associated with each network slice will send through a message the counting result for each network slice to the billing entity. A specific network slice can be mentioned in a message by an identifier.

When assigning resources to each network slice, the base station or the CCord should make sure that all the served UEs have assigned at least the minimum requested resources for operation. In this mode will be satisfied the operator requirement of isolating the network slices one from the other.

A more detailed accounting can involve, for each network slice, the QCI or the new QCI, the operator name (PLMN), the used spectrum.

RAN Sharing

In an embodiment shown in FIG. 1, on the virtualization platform the UEs served by a specific Operator have a dedicated VM for the processing of the higher layers, while an R-TP can be shared by multiple operators. This is a form of inter-operator infrastructure and/or spectrum sharing.

For example, UE4 has a subscription with Operator 1; within the computing platform VM1-131 is allocated to PLMN1 (Public Land Mobile Network) which is operated by Operator 1. VM2-132 is allocated to PLM2 and will process the traffic from UE1-151 and UE3-153. However both UE3 and UE4 can be served by the same R-TP1-121.

RAN Sharing Cost

A main advantage of RAN sharing is the availability of more radio nodes for serving an UE, reducing by this the energy consumption and increasing the peak data rates, especially when the spectrum is also shared.

However the cost of sharing should be taken in consideration. The cost can be function of the available resources and of the sharing time.

CCord can decide if the RAN sharing by a specific radio node can be accepted by an UE belonging to another operator based on the current cost of sharing of the radio infrastructure and of the cost of spectrum.

Based on a message from the CCord, a radio node will broadcast or not the PHY signaling of support for a PLMN.

The cost of RAN sharing may also depend on the network slice.

UE Block Diagram

Figure 2:
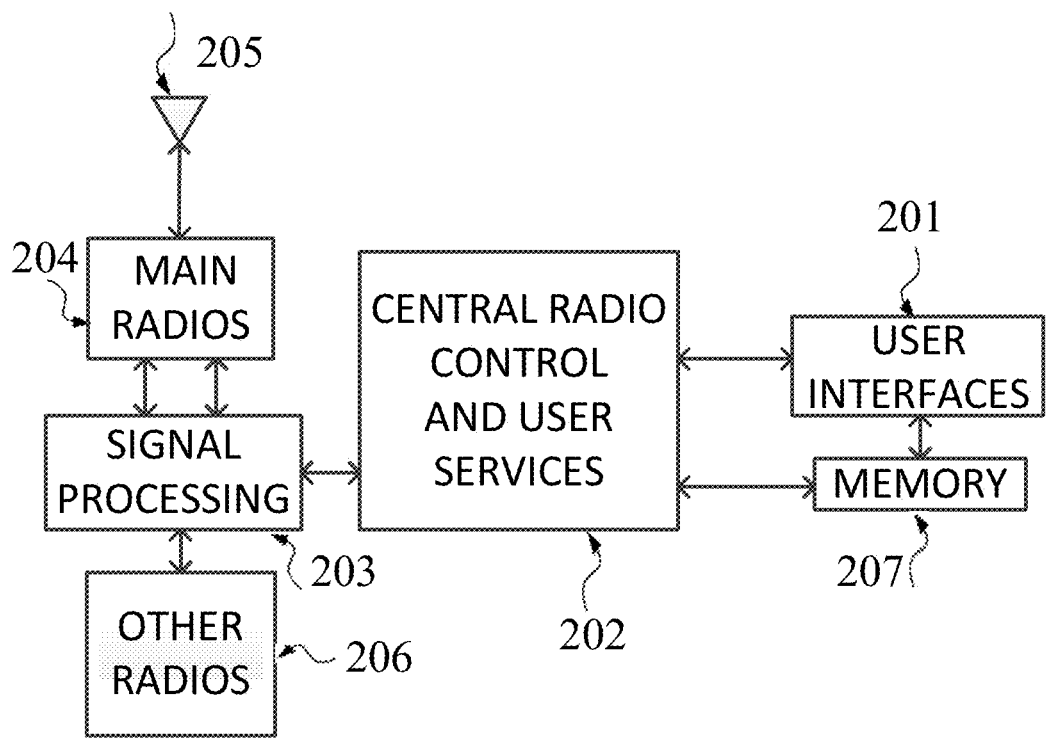

FIG. 2 shows the UE block diagram. The central radio control, including the functions related to the User Plane and Control Plane as described in 3GPP TS 36.300 and radio activities, is located within a central processing unit 202, which may also perform other high-layer user services, including running applications.

The user interfaces, such as the display, speaker, and microphone, are located in a user interface block 201.

A memory block 207, containing RAM and non-volatile memory (FLASH or ROM) is used by the central processing unit 202 and depending on the actual UE implementation, may be used also by the user interfaces 201.

Digital signal processing is performed by a signal processing block 203 and can give services to the radios using FDD for communication, like radios 204, for the cellular operation in licensed and un-licensed bands, and also to other radios-206, such as WiFi and Bluetooth, operating generally in license-exempt bands. Antennas 205 can be used for receive (RX) and transmit (TX), while using diplexers or switches to connect it. If the receive and transmit radio frequencies are far from each other, however, different antennas may be used.

TP Implementation

Figure 3:
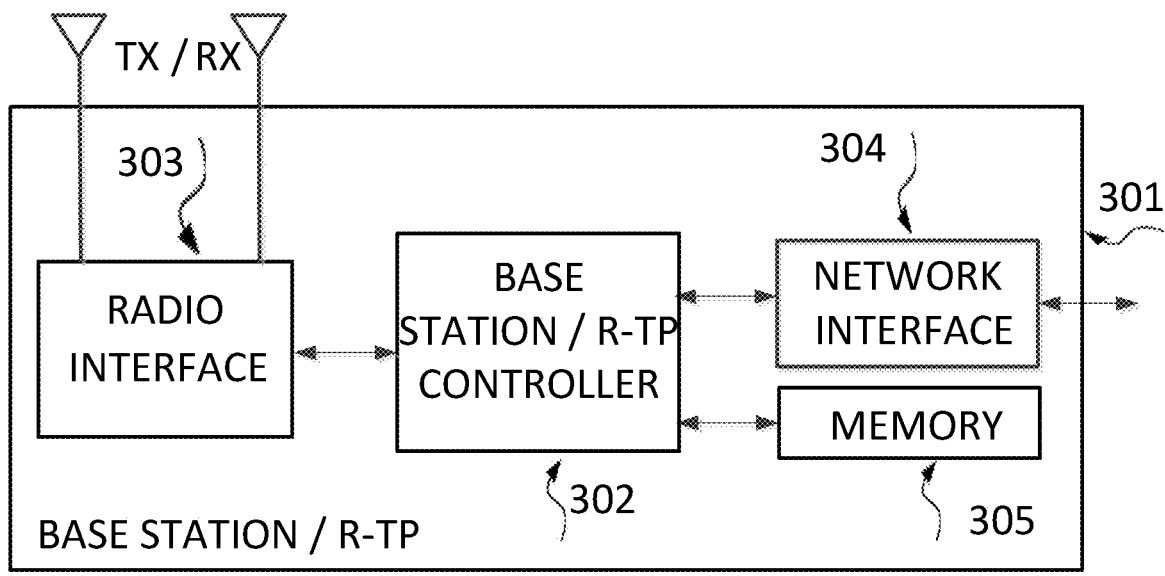

The base station or R-TP blocks shown in FIG. 3 are only by way of examples; in practical implementations these blocks can be distributed on multiple circuit boards, and the control functions and hardware functions can be implemented on commercial processors or tailor-made logical arrays, such as system-on-a-chip, FPGAs, ASICs.

The functional blocks of the base station/R-TP-301 identified as relevant to this invention are the radio interface 303, providing wireless communication with a UE, the network (communication) interface 304 enabling message transmission over the network, towards another base station or to the OAM or to a Central Coordinator.

The controller 302 includes as a subset of its functions, some functions relevant to this invention, such as scheduling of the reference signals, configuring and obtaining reports from an UE, including computing functions determining coupling loss or the path loss. The data used by the controller is stored in a memory block-305.

Computing Platform

Figure 4:
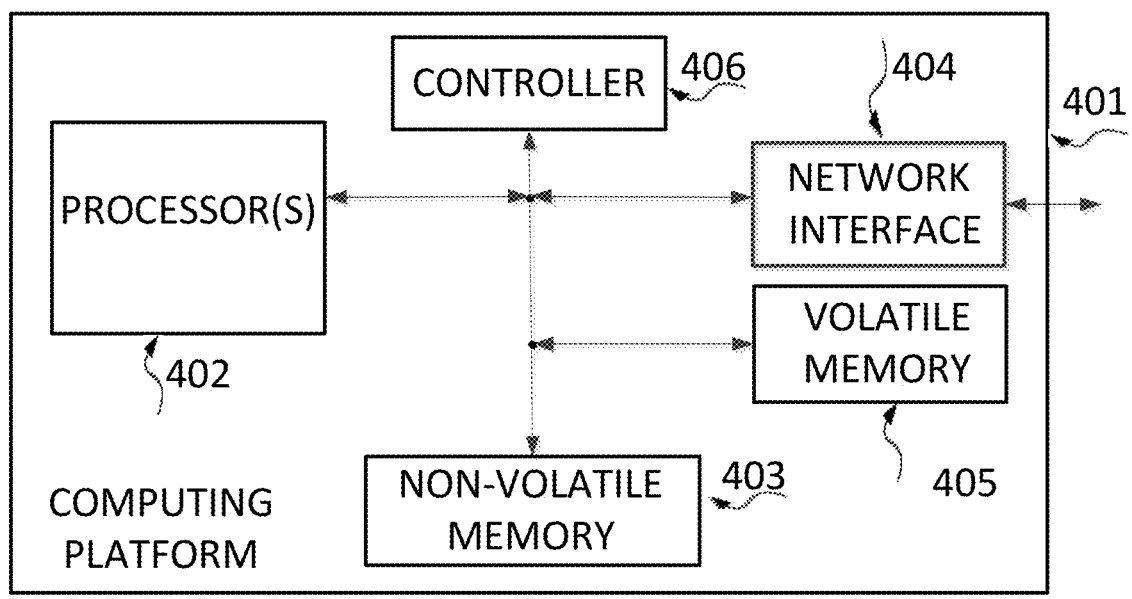

A computing platform 401 (see FIG. 4) is a system that consists of one or more processors 402, non-volatile memory 403, volatile memory 405, a network communication interface-404 and a system controller 406. An application, program or process runs over an operating system installed in the computing platform.

The computing resources of a computing platform can be dynamically allocated to one or more virtual machines, such that each virtual machine can use a number of processor cycles and a partition of the volatile and non-volatile memory.

Central Coordinator

The Central Coordinator includes one or more software modules, adapted for controlling the system nodes based on the received information.

The Central Coordinator defines, controls the system nodes and the UE and receive operational status information from virtualized or non-virtualized base stations, UE and VM Controller.

The Central Coordinator includes hardware computing resources such as one or more processors, memory, communication interfaces.

The Central Coordinator may use dedicated enclosures or can run its software on virtual machines or by other means for sharing resources with other software modules.

Technologies

As will be appreciated by those skilled in the art, the terminology used throughout the specification is mainly associated with the LTE standards. However, it should be understood that embodiments of the present invention encompass other existing and future cellular standards and other wireless systems used in terrestrial or satellite communications and both TDD and FDD duplexing modes.

The examples provided show certain ways of carrying out the invention. It is to be understood that invention is not intended to be limited to the examples disclosed herein. Rather, the invention extends to all functionally equivalent structures, methods and uses, as are within the scope of the claims.

The invention claimed is:

1. A method for cellular network operation, comprising:
    partitioning a base station in a cellular network into a virtualization platform and radio transceiver points;
    establishing communications between a given User Equipment (UE) and the virtualization platform via at least one Radio Transceiver Point (R-TP) that is associated with the base station, wherein the communications include PHY (Physical Layer) processing, Layer 2 processing, including functions within PDCP (Packet Data Convergence Protocol), RLC (Radio Link Control), and MAC (Medium Access Control), and wherein the PDCP sub-layer is located on the virtualization platform, while the other sub-layers and the PHY layer are located on each of the at least one radio transceiver point;
    establishing a central coordinator of the base station operation and a control interface between each R-TP and the virtualization platform or between each R-TP and the central coordinator;
    selecting by the central coordinator a downlink coordinated transmission mode that is to be applied to the communications between the given UE and the base station, and selecting a first R-TP and a second R-TP for coordinating their transmission;
    conveying over the control interface to the first R-TP a first message comprising an identifier of the given UE and a first specification of first time-frequency resources for user data transmission and a second specification of second time-frequency resources for reference signals, and conveying to the second R-TP a second message comprising the first specification of the first time-frequency resources and a third specification of third time-frequency resources for reference signals, wherein the reference signals are used for radio communication measurements; and
    performing the radio processing functions in the base station communications with the given UE, while executing the selected coordinated transmission mode by the first and the second R-TP in accordance with the first, the second and the third specifications of time-frequency resources.

2. The method according to claim 1, wherein the selection of the R-TPs suitable to the coordinated transmission mode depends on the delay between the virtualization platform and the radio transceiver involved in the given UE communication.

3. The method according to claim 1, wherein at least one but not all PHY processing functions are executed on the at least one R-TP.

4. The method according to claim 1 wherein the identified cooperative mode is sent by a message over the control interface to at least one of the first R-TP and the second R-TP.

5. The method according to claim 4 wherein the cooperative mode is Network MIMO.

6. The method according to claim 5 where the Network MIMO mode comprises interference cancellation.

7. The method according to claim 1 wherein the coordinated transmission mode is coordinated scheduling (CS) and/or coordinated beamforming (CB).

8. The method according to claim 7 wherein the given UE communicates only through the first R-TP while the second R-TP transmits in the first time-frequency resource to another UE selected such that the transmission of the second R-TP to the another UE will not create significant interference to the given UE.

9. The method according to claim 7 wherein for coordinated beamforming same user data for the given UE is sent from the virtualization platform to the first R-TP and to the second R-TP.

10. The method according to claim 1 wherein different user data for the given UE is sent to the first R-TP and to the second R-TP.

11. The method according to claim 1 wherein selecting the first and the second R-TP to transmit in the same first time-frequency resource is based on the coupling loss between the transmitting nodes and the target UEs.

12. The method according to claim 1 wherein the central coordinator receives the UE reports of the measurement result of at least one of: RSRP, RSRQ, CQI and MIMO rank.

13. Apparatus for deployment in a cellular network, in which a base station is partitioned into a virtualization platform and radio transceiver points and communications are established between a given User Equipment (UE) and the virtualization platform via at least one Radio Transceiver Point (R-TP) that is associated with the base station, wherein the communications include PHY (Physical Layer) processing and Layer 2 processing, including PDCP (Packet Data Convergence Protocol), RLC (Radio Link Control), and MAC (Medium Access Control) processing functions, and wherein the PDCP sub-layer is located on the virtualization platform, while the other sub-layers and the PHY layer are located on each of the at least one R-TP, the apparatus comprising:
- at least one network interface;
- a memory; and
- at least one processor, which is configured to operate as a virtualization platform on which is implemented as a part of the base station, and to establish, over the network interface, a control interface between each R-TP and the said apparatus and to make or receive, from a central coordinator, a selection of a downlink coordinated transmission mode that is to be applied to the communications between the given UE and the base station, and a selection of a first R-TP and of a second R-TP for coordinating their transmissions, and to convey over the control interface to the first R-TP a first message comprising an identifier of the given UE and a first specification of first time-frequency resources for user data transmission and a second specification of second time-frequency resources for reference signals, and to convey to the second R-TP a second message comprising the first specification of the first time-frequency resources and a third specification of third time-frequency resources for reference signals, wherein the reference signals are used by the given UE for radio communication measurements, and to perform the radio processing functions in the communications between the given UE and the base station, while executing the selected coordinated transmission mode by the first and the second R-TP in accordance with the first, the second and the third specifications of time-frequency resources.

14. The apparatus according to claim 13 wherein the processor sends over the control interface a message including the identified cooperative transmission mode to at least one of the first R-TP and the second R-TP.

15. Apparatus for deployment in a cellular network, in which a base station is partitioned into a virtualization platform and radio transceiver points and communications are established between a given User Equipment (UE) and the virtualization platform via at least one assigned Radio Transceiver Point (R-TP) that is associated with the base station, wherein the communications include PHY (Physical Layer) processing and Layer 2 processing, including PDCP (Packet Data Convergence Protocol), RLC (Radio Link Control), and MAC (Medium Access Control) processing functions, and wherein the PDCP sub-layer is located on the virtualization platform, while the other sub-layers are located on each of the at least one R-TP, the apparatus comprising:
- a network interface;
- a memory; and
- at least one processor, which is configured to serve as a central coordinator of the at least one R-TP and of the virtualization platform, wherein the at least one R-TP and the virtualization platform are able to perform the processing functions in the communications between the given UE and the base station, and to establish, over the network interface, a control interface between the said apparatus and each radio transceiver point, wherein the central coordinator makes a selection of a downlink coordinated transmission mode for the base station communication with the given UE and a selection of a first R-TP and a second R-TP for the execution of the selected coordinated transmission mode and conveys over the control interface to the first R-TP a first message comprising an identifier of the given UE and a first specification of first time-frequency resources for user data transmission and a second specification of second time-frequency resources for reference signals, and conveys to the second R-TP a second message comprising the first specification of the first time-frequency resources and a third specification of third time-frequency resources for reference signals, wherein the reference signals are used by the given UE for radio communication measurements, and the at least one of the first and the second R-TP and the virtualization platform perform the radio processing functions in the base station communications with the given UE, while the selected coordinated transmission mode is executed by the first and the second R-TP in accordance with the first, the second and the third specifications of time-frequency resources.

16. The apparatus according to claim 15 wherein the processor sends over the control interface a message including the identified cooperative transmission mode to the first R-TP and/or the second R-TP.

17. Radio Transceiver Point (R-TP) apparatus for deployment in a cellular network, in which a base station is partitioned into a virtualization platform and radio transceiver points and communications are established between a given User Equipment (UE) and the virtualization platform via at least one Radio Transceiver Point (R-TP) that is associated with the base station, wherein the communications include PHY (Physical Layer) processing and Layer 2 processing, including PDCP (Packet Data Convergence Protocol), RLC (Radio Link Control), and MAC (Medium Access Control), and wherein the PDCP sub-layer is located on the virtualization platform, while the other sub-layers and the PHY layer are located on each R-TP, and wherein a central coordinator selects a downlink coordinated transmission mode for the base station communication with the given UE and selects the said R-TP apparatus and another R-TP for the execution of the selected coordinated transmission mode, the apparatus comprising:
- a radio interface;
- a network interface;
- a memory; and
- at least one processor, which is configured to establish, over the network interface, a control interface between the said apparatus and the virtualization platform and/or between the said apparatus and the central coordinator and to receive over the control interface a first message comprising an identifier of the given UE and a first specification of first time-frequency resources for user data transmission and a second specification of a second time-frequency resources for reference signals, while the other R-TP receives a second message comprising the first specification of the first time-frequency resources and a third specification of third time-frequency resources for reference signals, wherein the reference signals are used by the given UE for radio communication measurements and to perform by the said apparatus and by the other R-TP, the radio processing functions in the base station communications with the given UE while the selected coordinated transmission mode is executed by the said apparatus and the other R-TP in accordance with the first, the second and the third specifications of time-frequency resources.

18. The apparatus according to claim 17 wherein the processor receives over the control interface a message including the identified cooperative transmission mode.

\* \* \* \* \*